United States Patent
Takada et al.

(12)

(10) Patent No.: US 6,364,987 B1
(45) Date of Patent: Apr. 2, 2002

(54) METHOD FOR PRODUCING GAS BARRIER FILM

(75) Inventors: Shigeki Takada; Sadahiko Shiraga, both of Kurashiki (JP)

(73) Assignee: Kuraray Co., Ltd., Kurashiki (JP)

( * ) Notice: Subject to any disclaimer, the term of this patent is extended or adjusted under 35 U.S.C. 154(b) by 0 days.

(21) Appl. No.: 09/517,004

(22) Filed: Feb. 28, 2000

(30) Foreign Application Priority Data

Mar. 10, 1999 (JP) ............................................. 11-063023

(51) Int. Cl.⁷ ............................................... B29C 47/06
(52) U.S. Cl. ............................. 156/244.11; 156/244.24; 264/171.13; 264/171.23; 264/177.19; 264/210.2; 264/288.4
(58) Field of Search ....................... 156/244.11, 244.24; 264/171.13, 171.23, 177.19, 129, 210.2, 288.4; 427/393.5, 420; 428/515–518

(56) References Cited

U.S. PATENT DOCUMENTS

| | | | | |
|---|---|---|---|---|
| 3,440,316 A | * | 4/1969 | Miyake et al. | |
| 3,585,177 A | * | 6/1971 | Gardner et al. | |
| 4,003,963 A | * | 1/1977 | Creasy et al. | |
| 4,230,654 A | * | 10/1980 | Kuga et al. | |
| 4,284,671 A | * | 8/1981 | Cancio et al. | |
| 4,544,698 A | * | 10/1985 | Roullet et al. | |
| 4,927,689 A | * | 5/1990 | Markiewicz | |
| 5,153,074 A | * | 10/1992 | Migliorini | |
| 5,482,770 A | * | 1/1996 | Bekele | |
| 5,491,023 A | * | 2/1996 | Tsai et al. | |
| 6,174,949 B1 | * | 1/2001 | Ninomiya et al. | |

FOREIGN PATENT DOCUMENTS

| JP | 5-116259 | 5/1993 |
|---|---|---|
| JP | 6-32924 | 2/1994 |

OTHER PUBLICATIONS

Concise Encyclopedia of Polymer Sci. and Eng., "Vinyl Alcohol Polymers", pp. 1223–1236, John Wiley & Sons, 1990.*

* cited by examiner

Primary Examiner—Mark Eashoo
(74) Attorney, Agent, or Firm—Oblon, Spivak, McClelland, Maier & Neustadt, P.C.

(57) ABSTRACT

Provided is a method for producing gas barrier film, in which the coating film produced has excellent, oxygen gas barrier properties and is influenced little by moisture. The method comprises extruding a polyvinyl alcohol which contains not more than 19 mol % of α-olefin units with not more than 4 carbon atoms, onto a substrate film, then stretching it at least 3-fold and subjecting it to heat treatment at a temperature not lower than 120° C.

17 Claims, No Drawings

METHOD FOR PRODUCING GAS BARRIER FILM

BACKGROUND OF THE INVENTION

1. Field of the Invention

The present invention relates to a method for producing gas barrier film, in which the coating film produced has excellent, oxygen gas barrier properties.

2. Description of the Related Art

For producing oxygen gas barrier films and wrapping materials comprising them, various methods are known. Of known wrapping materials, aluminium (hereinafter referred to as Al) foil has perfect oxygen gas barrier properties, but when used by itself, it often has pin holes. Therefore, proposed is a method of laminating Al foil with other layers to give laminate films. However, since laminate films with Al foil are not transparent, the contents wrapped with them are difficult to see. Other problems with them are that, after incinerated, they give a residue of Al, and that metal detectors could not be applied to them for detecting metals in the contents wrapped with them. Another method also proposed comprises depositing aluminium, silica or the like on substrates to produce gas barrier films, which, however, is still problematic in that the films produced will easily have pin holes when folded.

For producing other oxygen gas barrier films, for example, known is a method of coating substrates with polyvinylidene chloride (hereinafter referred to as PVDC). PVDC absorbs little moisture and exhibits good gas barrier capabilities even in high-humidity conditions, and is therefore used for coating various substrates. The substrates to be coated with PVDC include films of, for example, biaxially-oriented polypropylene (hereinafter referred to as OPP), biaxially-oriented nylon (as ON), biaxially-oriented polyethylene terephthalate (as OPET), cellophane, etc. However, PVDC-laminated films are problematic in that they give hydrogen chloride gas when incinerated as wastes.

For producing still other oxygen gas barrier films, also known is a method of coating filmy substrates with completely-hydrolyzed, non-modified polyvinyl alcohol optionally followed by heating them (see Japanese Patent Laid-Open No. 32924/1994). Polyvinyl alcohol films exhibit excellent oxygen gas barrier capabilities when they absorb only a small amount of moisture. In general, however, they absorb much moisture, and their oxygen gas barrier properties are greatly degraded in high-humidity conditions having a relative humidity of around 70% or higher. Polyvinyl alcohol films are formed by coating a solution of polyvinyl alcohol having a concentration of a few % to 10% or so onto substrates through gravure coating, roll coating or the like. In that method, the barrier layer of polyvinyl alcohol formed generally has a thickness of a few microns after dried. Therefore, if the films are stretched for improving their barrier properties, the thickness of the gas barrier layer will be reduced to smaller than 1 micron. As a result, the films could not substantially enjoy the effect of orientation. This is another problem with polyvinyl alcohol films. For reducing moisture absorption by polyvinyl alcohol and for improving the orientation of polyvinyl alcohol through stretching, proposed is a method of using an ethylene-vinyl alcohol copolymer (hereinafter referred to as EVOH) which has an ethylene comonomer content of more than 20 mol % (see Japanese Patent Laid-Open No. 116259/1993). This method is still problematic in that the degree of orientation of the polymer films produced therein is still low. If the degree of ethylene modification for the polymer is increased so as to increase the orientation of the polymer films, the melting point of the polymer resin will be lowered and, as a result, the films could not undergo satisfactory heat treatment.

SUMMARY OF THE INVENTION

The object of the present invention is to provide a method for producing gas barrier film, in which the coating film produced is influenced little by moisture and has excellent, oxygen gas barrier properties.

We, the present inventors have assiduously studied various methods for producing gas barrier films which are influenced little by moisture and have excellent oxygen gas barrier properties and which can therefore be substitutes for PVDC films, and, as a result, have found a method for producing excellent gas barrier films. The method we have found comprises extruding a polyvinyl alcohol which contains not more than 19 mol % of α-olefin units with not more than 4 carbon atoms onto a substrate film, then stretching it at least 3-fold and subjecting it to heat treatment at a temperature not lower than 120° C. Based on this finding, we have completed the present invention.

DESCRIPTION OF THE PREFERRED EMBODIMENTS

Polyvinyl alcohol to be used for producing the gas barrier film of the invention is described in detail.

Polyvinyl alcohol for use in the invention contains not more than 19 mol % of α-olefin units with not more than 4 carbon atoms. As the α-olefins, preferred are ethylene and propylene, especially ethylene.

In polyvinyl alcohol for use in the invention, the degree of modification with α-olefin units with not more than 4 carbon atoms is not more than 19 mol %, preferably falls between 3 and 19 mol %, more preferably between 5 and 18 mol %. If it is larger than 19 mol %, the melting point of the polyvinyl alcohol will be low, and the polymer crystal will partly fuse while heated after coated, whereby the barrier capabilities of the polymer films produced will be poor. Further in case it is not less than 3 mol %, the polymer films could exhibit good barrier capabilities in high-humidity conditions at a relative humidity of around 70% or more, and, in addition, they could be stretched to a satisfactory degree of orientation.

The degree of hydrolysis of polyvinyl alcohol for use in the invention preferably falls between 90 and 99.99 mol %, more preferably between 97 and 99.95 mol %, even more preferably between 99 and 99.90 mol %. Polyvinyl alcohol having a degree of hydrolysis of larger than 99.99 mol % is difficult to produce on an industrial scale. On the other hand, polyvinyl alcohol having a degree of hydrolysis of smaller than 90 mol % will be disadvantageous as its films could not exhibit satisfactory gas barrier capabilities.

The degree of polymerization of polyvinyl alcohol for use in the invention is preferably not larger than 2000, more preferably not larger than 1750, even more preferably between 100 and 1500, still more preferably between 200 and 1400. Polyvinyl alcohol having a degree of polymerization of higher than 2000 is not preferred, since its viscosity is too high and its coatability is poor. Polyvinyl alcohol having a degree of polymerization of lower than 100 is also not preferred, since the strength of its films is low and pin holes are often formed in the films. The degree of polymerization of polyvinyl alcohol is measured according to JIS K6726.

Polyvinyl alcohol for use in the invention contains not more than 19 mol % of α-olefin units with not more than 4 carbon atoms. Preferably, it further contains silyl group-containing units in an amount of not larger than 5 mol %. The silyl group-containing unit content of polyvinyl alcohol may be at most 5 mol %, but more preferably at most 3 mol %, even more preferably between 0.1 mol % and 1.5 mol %. If the silyl group-containing unit content is larger than 5 mol %, the stability of polyvinyl alcohol in aqueous solution will be extremely low. For introducing silyl groups into polyvinyl alcohol, preferably employed is a method of using a vinylalkoxysilane (e.g., vinyltrimethoxysilane, vinyltriethoxysilane, etc.) as the comonomer component.

Polyvinyl alcohol for use in the invention may be prepared in any known method.

It is desirable that polyvinyl alcohol for use in the invention contains sodium acetate in an amount of from 0.01 to 2% by weight. The sodium acetate content of polyvinyl alcohol preferably falls between 0.02 and 1% by weight, more preferably between 0.03 and 0.5% by weight, even more preferably between 0.03 and 0.45% by weight. If the sodium acetate content oversteps the range falling between 0.01 and 2% by weight, polyvinyl alcohol films could hardly have good gas barrier properties.

The coating liquid of polyvinyl alcohol for use in the invention is described. When applied to a substrate film, the coating polymer, polyvinyl alcohol has a viscosity falling preferably between 1 and 35000 poises. The viscosity of the coating polymer varies, depending on the degree of polymerization of the polymer, the temperature of the polymer and the concentration of the coating liquid of the polymer, but more preferably satisfies the requirement to be represented by either of the following formulae:

$$\text{When } 20° \text{ C.} \leq T \leq 120° \text{ C.; } 0.2\times(P/T) \leq \text{viscosity (poise)} \leq 500\times(P/T) \quad (1)$$

wherein the viscosity is measured at a shear rate of 10 cm$^{-1}$.

$$\text{When } 120° \text{ C.} < T \leq 250° \text{ C.; } 500\times(P/T) < \text{viscosity (poise)} \leq 5000\times(P/T) \quad (2)$$

wherein the viscosity is measured at a shear rate of 1000 cm$^{-1}$.

In these formulae, T indicates the temperature of the coating polymer (polyvinyl alcohol) or the coating liquid; and P indicates the viscosity-average degree of polymerization of the coating polymer.

In the case (1), the coating temperature preferably falls between 50 and 110° C., more preferably between 70 and 100° C.

In the case (2), the coating temperature preferably falls between 140 and 240° C., more preferably between 180 and 230° C.

It is desirable that the polyvinyl alcohol concentration in the coating liquid is so controlled that the coating polymer liquid could satisfy the above-mentioned relational formulae. Concretely, the polymer concentration therein may be selected from a range falling between 15 and 100%. The polymer concentration 100% means that the coating polymer liquid is an absolute polymer, polyvinyl alcohol not containing a solvent. Preferably, the polymer concentration in the coating liquid is at least 20 % but at most 90%, more preferably at most 50%. Using a polyvinyl alcohol hydrate or an aqueous solution of polyvinyl alcohol, of which the polymer content falls within the preferred range, gives a uniform coating layer. As the solvent for the coating liquid, preferred is water. Needless-to-say, mixed solvents of water with any of methanol, ethanol, isopropyl alcohol, n-propyl alcohol or the like may be used with no limitation. In view of their boiling point, preferred are mixed solvents of water with any of isopropyl alcohol and n-propyl alcohol.

The coating polymer liquid may contain a plasticizer, a melting point-lowering agent, etc. The optional additives include, for example, polyhydric alcohols such as glycerin, diglycerin, pentaerythritol, etc. Their amount may be generally at most 10% by weight of the absolute polymer, polyvinyl alcohol to which they are added. Further optionally, the coating polymer liquid may also contain an antifungal agent, a preservative, etc.

The method for preparing the coating liquid of polyvinyl alcohol for use in the invention is not specifically defined. For example, to prepare the coating polymer liquid that contains a solvent in an amount of 50% or more, the polymer, polyvinyl alcohol is dissolved in a solvent under heat to have a predetermined concentration in the resulting solution. The thus-prepared coating liquid is extruded out through a die at a predetermined temperature, onto a substrate film. On the other hand, the coating polymer liquid may be substantially free from a solvent. In that case, the polymer, polyvinyl alcohol may be directly introduced into a single-screw or double-screw extruder, melted under heat therein, and extruded out through its die onto a substrate film.

The coating liquid of polyvinyl alcohol for use in the invention may contain a crosslinking agent which is to improve the water-proofness of the polymer films to be produced. The crosslinking agent includes, for example, epoxy compounds, isocyanate compounds, aldehyde compounds, silica compounds, aluminium compounds, zirconium compounds, boron compounds, etc. Of those, preferred are silica compounds such as colloidal silica, alkyl silicates, etc. The amount of the crosslinking agent that may be in the coating liquid may fall generally between 5 and 60 parts by weight, but preferably between 10 and 40 parts by weight, more preferably between 15 and 30 parts by weight, relative to 100 parts by weight of the coating polymer, polyvinyl alcohol. If the amount of the crosslinking agent added is larger than 60 parts by weight, such a large amount of the crosslinking agent added will have some negative influences on the barrier properties of the polymer films formed. As the case may be, an inorganic substance such as tabular clay, mica, calcium carbonate or the like may be added to the coating polymer liquid, and its amount may fall generally between 5 and 60 parts by weight relative to 100 parts by weight of the coating polymer, polyvinyl alcohol.

The polymer films to be produced in the invention are described. In the method of the invention, the coating polymer, polyvinyl alcohol is coated onto a substrate film, and thereafter the polymer layer thus formed on the substrate film must be stretched at least 3-fold and must be subjected to heat treatment at a temperature not lower than 120° C.

Where the polymer coating temperature is as in the case (1) noted above, it is desirable that the coated polymer liquid is dried on the substrate to thereby reduce the volatile content of the coated polymer to at most 20%, more preferably at most 10%, and to at least 0.1%, more preferably at least 1%, most preferably at least 2% . Even when the volatile content of the coated polymer is larger than the range, the polymer layer formed could be stretched in the subsequent step. However, the volatile substance existing in the polymer layer formed will vaporize to form bubbles in the layer. If so, it is often difficult to produce a uniform polymer layer. The temperature at which the coated polymer liquid is dried in the drying step is not specifically defined.

In view of the productivity of polymer films, the drying temperature preferably falls between 70 and 110° C.

The same as in the case (1) may apply to the case (2) indicating the polymer coating temperature. Also in the case (2), the volatile content of the coated polymer is preferably controlled to be at most 20%. However, if the coating polymer liquid has a solvent concentration of not higher than 20%, the drying step could be omitted.

The thickness of the coated polymer film of polyvinyl alcohol, thus formed in the invention to have a volatile content of at most 20%, is not specifically defined. However, in consideration of the subsequent step of stretching the polymer film, the thickness of the polymer film shall be at least 10 μm, but preferably at least 15 μm, more preferably between 20 μm and 100 μm. Forming too thick films having a thickness of larger than 100 μm is unfavorable in view of the production costs.

The next step of stretching the polymer film is described. Immediately after formed, the polyvinyl alcohol film having a volatile content of at most 20% may be directly stretched. However, in the case (2) indicating the coating polymer liquid temperature, it is desirable that the polymer film formed is once cooled to 100° C. or lower before it is stretched. The stretching temperature may be selected from a preferred range falling between 90 and 230° C., but, in general, it may be the same as or lower than the temperature for heat treatment or thermal fixation of the polymer film.

Regarding the stretching direction, the polymer film may be stretched in any direction, either in the lengthwise direction (machine direction, MD) or in the widthwise direction (transverse direction, TD), relative to the direction in which the film is formed, or even in both MD and TD for biaxial orientation. In the stretching step, the draw ratio in MD and TD stretching, and also the order of MD or TD stretching are not specifically defined. Needless-to-say, the stretching temperature may be varied in MD and TD stretching. Preferably, however, the polymer film is monoaxially stretched in TD, or is biaxially stretched in MD and TD. The draw ratio in stretching must be at least 3, or that is, the polymer film is stretched at least 3-fold. Preferably, the draw ratio is at least 5, more preferably at least 9, even more preferably at least 12. The draw ratio indicates the ratio of the thickness of the non-stretched film to that of the stretched film. Also preferably, the draw ratio is at most 50, more preferably at most 40.

The heat treatment of the stretched polymer film is described. Indispensably, the temperature for the heat treatment is not lower than 120° C., but preferably not lower than 140° C., more preferably between 150 and 240° C., even more preferably between 160 and 200° C.

Where the stretching temperature in the previous step is not lower than 120° C., the polymer film could be subjected to heat treatment while it is stretched. If desired, however, the stretched polymer film may be subjected to thermal fixation for the intended heat treatment. So far as the polymer film being subjected to heat treatment could reach the intended temperature for the treatment, the time for the treatment is not specifically defined, but may fall generally between 10 seconds to 5 minutes or so. Preferably, the heat treatment is effected in air.

The gas barrier film formed in the method of the invention will have an oxygen transmission rate, as measured at 20° C. and 90% RH, of at most 30 cc/m$^2$·day·atm, in terms of a unit thickness, 2 μm, of the coated polymer layer of polyvinyl alcohol. In the method of the invention, where the coating step is combined with the subsequent step of stretching and heat treatment in the preferred manner as noted hereinabove, the gas barrier film formed could have a reduced oxygen transmission rate of at most 15 cc/m$^2$·day·atm, especially at most 10 cc/m$^2$·day·atm.

The substrate films to be coated with the coating polymer to produce the gas barrier film of the invention include, for example, polyolefin films, polyester films, polyamide films, etc.

It is desirable to incorporate silicon (Si) into the substrate film of polyolefin films, polyester films, polyamide films, etc. The silicon content of the substrate film is preferably at most 2% by weight, more preferably at most 1% by weight, even more preferably between 0.1 and 0.5% by weight. Polyolefin films, polyester films and polyamide films that contain silicon in an amount of from 0.1 to 2% by weight could have increased adhesiveness to the polymer films formed thereon. Silicon is added to those films generally in the form of a silica compound. For this, employable are any known silica compounds such as silicon oxide, alkyl silicates, etc. Of those, preferred is colloidal silica (SiO$_2$). For adding a silica compound to the substrate film, generally employed is a method of mixing the compound with a resin to prepare a filming composition that contains the compound followed by forming the composition into films.

The thickness of the substrate film (where the film is stretched, its final thickness) preferably falls between 5 and 100 μm.

In order to improve the adhesiveness between the polyvinyl alcohol film layer and the substrate film layer, an adhesive component layer may be disposed therebetween. The adhesive component may be applied to the surface of the substrate film before the substrate film is coated with an aqueous solution of the coating polymer, or, alternatively, it may be mixed in the aqueous solution of the coating polymer before the aqueous polymer solution is coated onto the substrate film. The adhesives to be used herein for that purpose are not specifically defined, and may be any known conventional ones. However, preferred are isocyanate-type, urethane-type, polyester-type, and imine-type adhesives.

The gas barrier film of the invention generally has a heat seal resin layer as formed on the polyvinyl alcohol film layer. For forming the heat seal resin layer, in general, employed is extrusion lamination or dry lamination. As heat seal resins for the layer, employable are polyethylene resins such as HDPE, LDPE, LLDPE, etc., as well as PP resins, ethylene-vinyl acetate copolymers, ethylene-α-olefin random copolymers, ionomer resins, etc. As the case may be, an adhesive layer may be provided between the polyvinyl alcohol film layer and the heat seal resin layer.

EXAMPLES

The invention is described more concretely with reference to the following Examples and Comparative Examples, which, however, are not intended to restrict the scope of the invention.

In the following Examples and Comparative Examples, "part" and "%" are by weight, unless otherwise specifically indicated. To measure their oxygen transmission rate (OTR, cc/m$^2$·day·atm), the polyvinyl alcohol-coated films (laminates composed of a substrate and polyvinyl alcohol) were previously conditioned at a temperature of 20° C. and at a relative humidity of 90% for 7 days, and then tested. The oxygen transmission rate of each sample shown in the following indicates the unit value thereof in terms of a unit thickness, 2 μm, of the coated polymer layer of polyvinyl alcohol.

Example 1

Polyvinyl alcohol having a degree of polymerization of 1050, a degree of hydrolysis of 99.0 mol %, a degree of modification with ethylene of 6.5 mol %, and a sodium acetate content of 0.4% by weight was dissolved in water at 90° C. to prepare an aqueous 20% solution. The solution had a viscosity of 9 poises. This was extruded onto a non-stretched polypropylene film which had been previously subjected to corona treatment and coated with an isocyanate adhesive of 1 μm thick, at 90° C., and then dried at 100° C. to form thereon a gas barrier layer of polyvinyl alcohol having a thickness of 20 μm. The water content of the barrier layer was 2% by weight of polyvinyl alcohol.

Next, the resulting film laminate (composed of the non-oriented polypropylene substrate, the adhesive layer and the barrier layer of polyvinyl alcohol) was set on a stretcher, monoaxially stretched at 120° C., and heated in air at 160° C. for 1 minute for thermal fixation. After having been thus stretched and heated, the gas barrier layer of polyvinyl alcohol had a thickness of 1.8 μm. The draw ratio was 20/11.8=11.

The film laminate thus stretched and heated was then conditioned at 20° C. and 90% RH for 7 days, and its barrier capability was measured under that condition. The oxygen transmission rate of the film laminate thus measured was 5.7 cc/m$^2$·day·atm.

Example 2

The same polyvinyl alcohol as in Example 1 was processed under the same condition as therein to prepare its solution.

The solution was extruded onto a non-stretched nylon, and dried at 100° C. to form thereon a polyvinyl alcohol layer having a thickness of 15 μm. The water content of the coated polymer layer was 1.7% by weight. Next, the resulting film laminate was set on a stretcher, biaxially stretched at 200° C. at the same draw ratio in MD and TD directions, and heated at 200° C. for 2 minutes for thermal fixation. After having been thus stretched and heated, the polyvinyl alcohol layer had a thickness of 1.6 μm. The draw ratio was 15/1.6=9.4.

The film laminate thus stretched and heated was then conditioned at 20° C. and 90% RH for 7 days, and its barrier capability was measured under that condition. The oxygen transmission rate of the film laminate thus measured was 2.1 cc/m$^2$·day·atm.

Example 3

The same process as in Example 2 was repeated. In this, however, the substrate film used was a non-oriented polyester film that had been subjected to corona treatment and coated with an isocyanate anchor coat layer having a thickness of 0.5 μm.

Having been stretched and heated, the film laminate produced herein was conditioned at 20° C. and 90% RH for 7 days, and its barrier capability was measured under that condition. The oxygen transmission rate of the film laminate thus measured was 2.3 cc/m$^2$·day·atm.

Example 4

Polyvinyl alcohol having a degree of polymerization of 1700, a degree of hydrolysis of 99.6 mol %, and a sodium acetate content of 0.2% by weight (this was not modified with ethylene) was dissolved in water at 98° C. to prepare an aqueous 25% solution. The solution had a viscosity of 1600 poises.

This was extruded onto a non-stretched polypropylene film which had been previously subjected to corona treatment and coated with an isocyanate adhesive of 1 μm thick, at 90° C., and then dried at 100° C. to form thereon a gas barrier layer of polyvinyl alcohol having a thickness of 20 μm. The water content of the barrier layer was 2.4% by weight of polyvinyl alcohol.

Next, the resulting film laminate (composed of the non-oriented polypropylene substrate, the adhesive layer and the barrier layer of polyvinyl alcohol) was set on a stretcher, monoaxially stretched at 120° C., and heated at 160° C. for 1 minute for thermal fixation. After having been thus stretched and heated, the gas barrier layer of polyvinyl alcohol had a thickness of 2.2 μm. The draw ratio was 20/2.2=9.1.

The film laminate thus stretched and heated was then conditioned at 20° C. and 90% RH for 7 days, and its barrier capability was measured under that condition. The oxygen transmission rate of the film laminate thus measured was 12 cc/m$^2$·day·atm.

Example 5

Polyvinyl alcohol having a degree of polymerization of 500, a degree of hydrolysis of 99.2 mol %, a degree of modification with ethylene of 17.8 mol %, a degree of silyl modification with vinyltrimethoxysilane of 0.25 mol %, and a sodium acetate content of 0.3% by weight was dissolved in a mixed solvent of water/n-propyl alcohol (6/4, by weight) at 85° C. to prepare an aqueous 25% solution. The solution had a viscosity of 8 poises.

This was extruded onto a non-stretched polypropylene film which had been previously subjected to corona treatment and coated with an isocyanate adhesive of 1 μm thick, at 85° C., and then dried at 100° C. to form thereon a gas barrier layer of polyvinyl alcohol having a thickness of 21 μm. The volatile content of the barrier layer was 1.3% by weight of polyvinyl alcohol.

Next, the resulting film laminate (composed of the non-oriented polypropylene substrate, the adhesive layer and the barrier layer of polyvinyl alcohol) was set on a stretcher, monoaxially stretched at 120° C., and heated at 160° C. for 1 minute for thermal fixation. After having been thus stretched and heated, the gas barrier layer of polyvinyl alcohol had a thickness of 1.5 μm. The draw ratio was 21/1.5=14.

The film laminate thus stretched and heated was then conditioned at 20° C. and 90% RH for 7 days, and its barrier capability was measured under that condition. The oxygen transmission rate of the film laminate thus measured was 1.2 cc/m$^2$·day·atm.

Example 6

An isocyanate adhesive was extruded in melt onto a non-oriented polypropylene film that had been previously subjected to corona treatment. The same polyvinyl alcohol as In Example 5 was melted in a single-screw extruder at 210° C., and extruded out through its die onto the adhesive-coated polypropylene film to produce a laminate (composed of the non-stretched polypropylene substrate, the adhesive layer and the polyvinyl alcohol layer). The polymer melt had a viscosity of 9000 poises. The barrier layer of polyvinyl alcohol formed on the substrate had a thickness of 14 μm, and its volatile content was 0.2% by weight.

Next, the resulting film laminate was set on a stretcher, monoaxially stretched at 120° C., and heated at 160° C. for 1 minute for thermal fixation. After having been thus stretched and heated, the gas barrier layer of polyvinyl alcohol had a thickness of 1.3 μm. The draw ratio was 14/1.3=10.8.

The film laminate thus stretched and heated was then conditioned at 20° C. and 90% RH for 7 days, and its barrier capability was measured under that condition. The oxygen transmission rate of the film laminate thus measured was 2.3 cc/m$^2$·day·atm.

Example 7

An isocyanate adhesive was extruded in melt onto a non-oriented polypropylene film that had been previously subjected to corona treatment. The same polyvinyl alcohol as in Example 1 was melted in a single-screw extruder at 230° C., and extruded out through its die onto the adhesive-coated polypropylene film to produce a laminate (composed of the non-stretched polypropylene substrate, the adhesive layer and the polyvinyl alcohol layer). The polymer melt had a viscosity of 30000 poises. The barrier layer of polyvinyl alcohol formed on the substrate had a thickness of 16 μm, and its volatile content was 0.1% by weight.

Next, the resulting film laminate was set on a stretcher, monoaxially stretched at 120° C., and heated at 160° C. for 1 minute for thermal fixation. After having been thus stretched and heated, the gas barrier layer of polyvinyl alcohol had a thickness of 1.8 μm. The draw ratio was 16/1.8=8.9.

The film laminate thus stretched and heated was then conditioned at 20° C. and 90% RH for 7 days, and its barrier capability was measured under that condition. The oxygen transmission rate of the film laminate thus measured was 5.3 cc/m$^2$·day·atm.

Comparative Example 1

A film laminate was produced in the same manner as in Example 1. In this, however, the stretching temperature was 100° C. and the heating temperature for thermal fixation was 100° C. The gas barrier layer of polyvinyl alcohol formed on the substrate had a thickness of 2.1 μm.

The film laminate was conditioned at 20° C. and 90% RH for 7 days, and its barrier capability was measured under that condition. The oxygen transmission rate of the film laminate thus measured was 56 cc/m$^2$·day·atm.

Comparative Example 2

A film laminate was produced in the same manner as in Example 2. In this, however, the film laminate was not stretched but was directly heated at 200° C. The gas barrier. layer of polyvinyl alcohol formed on the substrate had a thickness of 14 μm . The film laminate was conditioned at 20° C. and 90% RH for 7 days, and its barrier capability was measured under that condition. The oxygen transmission rate of the film laminate thus measured was 47 cc/m$^2$·day·atm.

Comparative Example 3

Polyvinyl alcohol having a degree of polymerization of 550, a degree of hydrolysis of 99.0 mol %, a degree of modification with ethylene of 8.5 mol %, and a sodium acetate content of 0.4% by weight was dissolved in water at 90° C. and then cooled to 50° C. to prepare an aqueous 7% solution. The solution had a viscosity of 0.1 poises. This was extruded onto a non-stretched polypropylene film which had been previously subjected to corona treatment and coated with an isocyanate adhesive of 1 μm thick, at 50° C., and then dried at 100° C. to form thereon a gas barrier layer of polyvinyl alcohol having a thickness of 4 μm. The water content of the barrier layer was 1.2% by weight of polyvinyl alcohol.

Next, the resulting film laminate (composed of the non-oriented polypropylene substrate, the adhesive layer and the barrier layer of polyvinyl alcohol) was set on a stretcher, monoaxially stretched at 120° C., and heated at 160° C. for 1 minute for thermal fixation. In this process, however, the gas barrier layer of polyvinyl alcohol was delaminated and cracked, and the oxygen transmission rate of the film laminate could not be measured.

Comparative Example 4

The same process as in Example 1 was tried. In this, however, an ethylene-vinyl alcohol copolymer having a degree of polymerization of 1050, a degree of hydrolysis of 99.0 mol %, a degree of modification with ethylene of 27 mol % and a sodium acetate content of 0.4% by weight was used in place of the polyvinyl alcohol solution in Example 1. The copolymer was melted in a single-screw extruder at 230° C., and extruded out through its die onto a non-oriented polypropylene film which had been previously subjected to corona treatment and coated with an isocyanate adhesive of 1 μm thick, thereby forming thereon a barrier layer of ethylene-vinyl alcohol having a thickness of 20 μm.

The laminate film thus produced herein was stretched and heated under the same condition as in Example 1, but its barrier layer was delaminated and broken.

Comparative Example 5

Polyvinyl alcohol having a degree of polymerization of 1700, a degree of hydrolysis of 99.6 mol %, and a sodium acetate content of 0.2% by weight (this was not modified with ethylene) was dissolved in water at 98° C. to prepare an aqueous 25% solution. The solution had a viscosity of 1600 poises.

This was extruded onto a biaxially-oriented polypropylene film (OPP) which had been previously subjected to corona treatment and coated with an isocyanate adhesive of 1 μm thick, at 90° C., and then dried at 100° C. to form thereon a gas barrier layer of polyvinyl alcohol having a thickness of 20 μm. The water content of the barrier layer was 2.4% by weight of polyvinyl alcohol.

Next, the resulting film laminate (composed of OPP, the adhesive layer and the barrier layer of polyvinyl alcohol) was heated at 160° C. for 1 minute for thermal fixation.

The film laminate thus heated was then conditioned at 20° C. and 90% RH for 7 days, and its barrier capability was measured under that condition. The oxygen transmission rate of the film laminate thus measured was 60 cc/m$^2$·day·atm. According to the method of the invention, obtained are gas barrier films having excellent oxygen gas barrier capabilities, which are influenced little by moisture.

While the invention has been described in detail and with reference to specific embodiments thereof, it will be apparent to one skilled in the art that various changes and modifications can be made therein without departing from the spirit and scope thereof.

What is claimed is:

1. A method for producing gas barrier film, comprising extruding a polyvinyl alcohol which contains not more than 19 mol % of α-olefin units with not more than 4 carbon atoms, onto a substrate film, then stretching said substrate film at least 3-fold and subjecting it to heat treatment at a temperature not lower than 120° C., wherein the gas barrier film formed has an oxygen transmission rate of not more than 30 cc/m$^2$·day·atm.

2. The method for producing gas barrier film as claimed in claim 1, wherein the polyvinyl alcohol has a viscosity of from 1 poise to 35000 poises.

3. The method for producing gas barrier film as claimed in claim 1, wherein the polyvinyl alcohol contains from 3 to 19 mol % of α-olefin units with not more than 4 carbon atoms.

4. The method for producing gas barrier film as claimed in claim 1, wherein the α-olefin unit is an ethylene unit.

5. The method for producing gas barrier film as claimed in claim 1, wherein the polyvinyl alcohol has a degree of hydrolysis of from 90 to 99.99 mol %.

6. The method for producing gas barrier film as claimed in claim 1, wherein the polyvinyl alcohol contains from 0.01 to 2% by weight of sodium acetate.

7. The method for producing gas barrier film as claimed in claim 1, wherein the polyvinyl alcohol contains at most 5 mol % of silyl group-having units.

8. The method for producing gas barrier film as claimed in claim 1, wherein a hydrate or an aqueous solution of the polyvinyl alcohol is extruded out onto a substrate film.

9. The method of claim 1, wherein the gas barrier film formed has an oxygen transmission rate of not more than 15 cc/m$^2$·day·atm.

10. The method of claim 1, wherein the gas barrier film formed has an oxygen transmission rate of not more than 10 cc/m$^2$·day·atm.

11. The method of claim 1, wherein the temperature is not lower than 140° C.

12. The method of claim 1, wherein the temperature is from 150 to 240° C.

13. The method of claim 1, wherein the temperature is from 160 to 200° C.

14. The method of claim 1, wherein the thickness of the gas barrier film is from 5 to 100 μm.

15. The method of claim 1, wherein the substrate is stretched at least 5-fold.

16. The method of claim 1, wherein the substrate is stretched at least 9-fold.

17. The method of claim 1, wherein the substrate is stretched at least 12-fold.

* * * * *